No. 747,763. PATENTED DEC. 22, 1903.
W. H. PRATT.
REGISTERING MECHANISM.
APPLICATION FILED SEPT. 24, 1901.
NO MODEL.
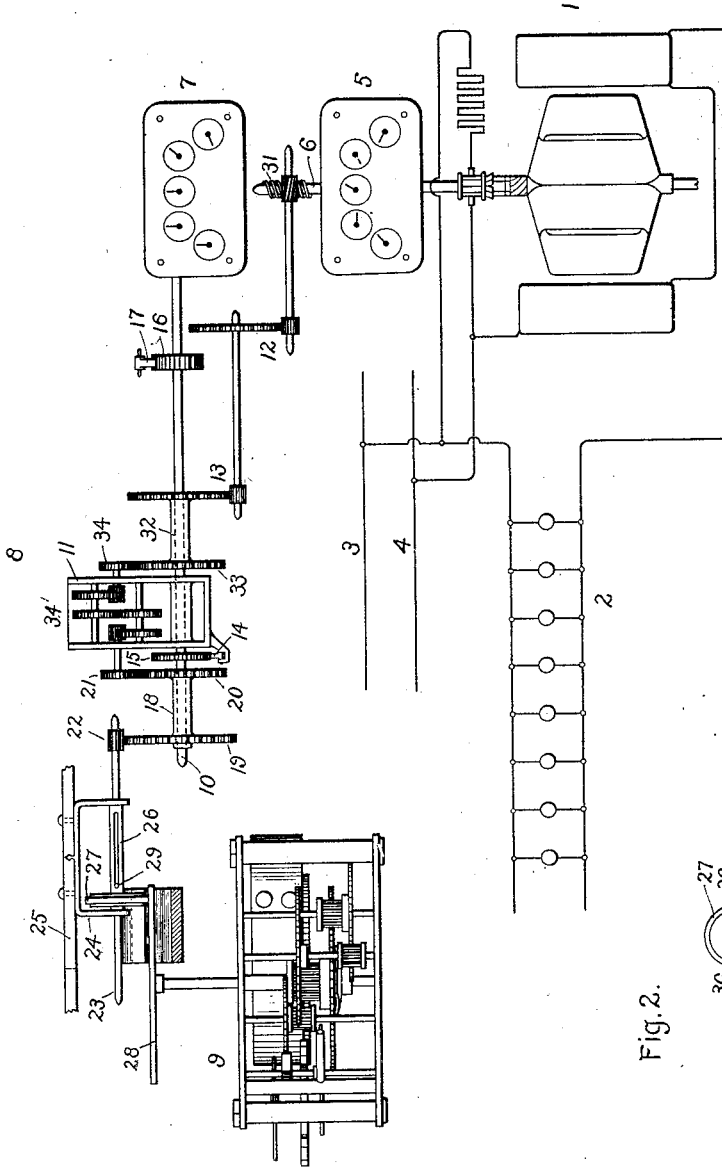
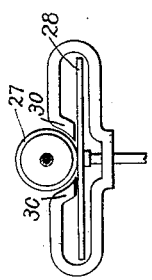
Witnesses.
John Ellis Glenn.
Mabel H. Emerson.
Inventor.
William H. Pratt.
by Albert G. Davis
Atty.

No. 747,763. Patented December 22, 1903.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

REGISTERING MECHANISM.

SPECIFICATION forming part of Letters Patent No. 747,763, dated December 22, 1903.

Application filed September 24, 1901. Serial No. 76,415. (No model.)

*To all whom it may concern:*

Be it known that I, WILLIAM H. PRATT, a citizen of the United States, residing at Lynn, county of Essex, State of Massachusetts, have invented certain new and useful Improvements in Registering Mechanism, of which the following is a specification.

My present invention relates to certain improvements in connection with integrating or other recording meters and although designed more particularly for use in connection with electric meters is applicable, however, to meters of other types without departing from the spirit of my invention.

In measuring electric or other energy it is frequently desirable to record the amount of energy consumed in excess of a certain predetermined rate in order that this excess may be charged to the customer at a separate rate. Thus, by way of example, in a certain distribution-circuit it may be found necessary to measure or sum up the consumption of energy in excess of, say, ten thousand watts at all times when the expenditure of energy in that circuit is equal to or exceeds the predetermined amount of ten thousand watts. My invention enables such a result to be secured, but is not, as above intimated, to be considered as limited to the measurement of electrical energy only. To illustrate the principle of the invention, however, an electric measuring apparatus embodying my invention is hereinafter described in connection with the accompanying drawings, in which—

Figure 1 is a representation, more or less diagrammatic, of an electric meter provided with a recording mechanism in accordance with my invention; and Fig. 2, a view of a detail of such mechanism.

In carrying my invention into practice the electric or other meter may, if desired, be provided with a dial or counter which sums up the entire quantity measured, the provision of this dial being, however, optional, so far as concerns the broad features of my invention. A second dial or counter is also provided and is connected to the meter in a manner about to be described. These connections are such that the meter tends to drive the counter forward, while some device, such as a clockwork, running at constant speed is provided and connected so that it has a tendency to run the counter backward at a certain definite speed, this tendency, however, being prevented from accomplishing any actual backward movement by the employment of some mechanical device, such as a ratchet and pawl. When the forward movement of the meter is sufficient to counteract the backward movement due to the clockwork, the counter commences to register, the amount of registration being, as is evident, a measure of any excess of the total energy or other quantity measured over a certain constant quantity, dependent upon the speed of backward movement of the clockwork.

Referring to Fig. 1 of the drawings, 1 indicates a recording electric wattmeter, which is typical of a suitable measuring instrument to which the invention may be applied. This meter is shown as connected in circuit with a bank of translating devices 2, receiving current from the supply-mains 3 4. A counter or register 5 may be geared to the shaft 6 of the meter in a usual way and will therefore serve to sum up the total number of revolutions made by the meter. Another counter 7 is also arranged to be driven from the shaft of the meter, the arrangement, however, being such that the driving connection does not actually become effective until the speed of the meter reaches a predetermined amount or, which is the same thing, until the amount of energy measured by the meter reaches a predetermined value. To accomplish the result mentioned, a differential gearing is employed, this gearing being indicated generally at 8. A clockwork 9 tends to communicate a backward motion to the shaft 10, upon which is mounted a frame 11, carrying the gearing 8. The train of gears 12 and 13 tend to produce a forward motion of the shaft 10, such as will actuate the register or counter 7.

Referring now more in detail to the mechanism thus briefly indicated, it will be noted that the frame 11, mounted on the shaft 10, carries a pawl 14, which by a spring or other means is urged into engagement with a ratchet-wheel 15, secured to the shaft 10. The pawl is inclined to the ratchet-wheel in such a direction that its end will slide over the ratchet when the frame 11 rotates backward from the position indicated. A reversely-arranged ratchet 16 and pawl 17 prevent any backward rotation of the shaft 10, due to backward rotation of the frame 11, mounted on the shaft 10, or of other parts geared thereto, such as the sleeve 18, carrying the gears 19 and 20. This sleeve is loosely mounted on the shaft 10 and is arranged so that the gear 20 meshes with a gear 21, carried by the frame 11, while the gear 19 meshes in a similar manner with a pinion 22 on a shaft 23, supported in bearings in the downwardly-extending arms or brackets 24, adjustably carried by the framework 25. Between these arms and concentric with the shaft 23 is a slotted sleeve 26, carrying a roller 27, the edge of which is adapted to engage a revolving disk 28, driven by the clockwork 9. A pin 29, projecting from the shaft 23 into the slot in the sleeve 26, as shown, serves to transmit rotary motion from the roller 27 to the shaft 23, which motion is in turn communicated by the pinion 22 to the gear 19 on the sleeve 18.

In order to adjust the speed of rotation of the shaft 23, the roller 27 is by means of the adjustable connection between the bracket or arm 24 and the frame 25 movable toward or away from the center of the disk 28. This disk being driven at a substantially constant speed by the clockwork 9, it will be evident that the roller 27 will be driven slower in positions near the middle of the disk and faster as its distance from the center increases. Within the limits of speed thus provided any desired adjustment within the limits of the instrument may be secured.

In order to hold the roller 27 in engagement with the disk 28, I make use of a magnetic device. (Indicated more in detail in Fig. 2.) The roller consists of a disk 27 of leather or some other suitable substance, on either side of which is mounted a ring of magnetic material, these rings being indicated clearly in the drawings. A permanent magnet of the form shown in Fig. 2 is mounted so as to embrace the disk 28 in such a manner as to bring its poles 30 below the axis of the roller 27. The pull exerted by the magnet on the disks of magnetic material forming a portion of the roller serves to force the roller into engagement with the disk 28.

Referring now to the train of gears 12 13 coöperating with the worm and worm-wheel 31 on the meter-shaft, it will be seen that one of these gears—to wit, the gear 13—is secured to a sleeve 32, which sleeve carries in addition another gear 33, engaging with a small gear 34, carried by the frame 11. The gears 34 and 21 are operatively related to each other through a train of gears 34', mounted in the framework 11.

From the description above given the operation of the device will be readily perceived. The clockwork 9 is driven in such a direction as to cause a rotation of the sleeve 18, represented by a backward movement of the upper portion of the same. Provided the meter 1 is at rest, this motion will cause a backward rotation of the frame 11. When the meter 1 commences to run, an opposite direction of rotation will be communicated to the sleeve 32, which as the speed of the sleeve increases will decrease the speed of rotation of the frame 11 and if the speed of the meter 1 rises sufficiently will reverse the direction of rotation of the frame 11, which will thereupon, through the coöperation of the pawl 14 and ratchet-wheel 15, cause a forward motion of the shaft 10, and thereby actuate the register or counter 7. The speed of rotation of the shaft 23 having been adjusted to a predetermined amount, it will be evident that the counter or register 7 will then represent the summation of such amounts of energy as may be expended when the total expenditure of energy is in excess of a predetermined amount, which amount is dependent upon the adjustment of the speed of the shaft 23, driven by the clockwork 9.

What I claim as new, and desire to secure by Letters Patent of the United States, is—

1. The combination with an integrating-meter, of means for registering thereby any excess of the quantity measured over and above a certain predetermined amount.

2. The combination of a meter, a register or counter, and means for causing the register or counter to register a quantity corresponding to the number of revolutions of the meter which are at any time in excess of a predetermined constant speed.

3. In an electric metering device, the combination of two counters or registering devices, means for registering on one the total energy consumption of a circuit, and means for recording on the other the excess consumption above a predetermined rate.

4. In a metering device, the combination of a meter, a counter or register, a differential gear having one member connected to said counter or register, another member to said meter, and a source of constant speed connected to a third member of said gear.

5. In a metering device, the combination of a meter, a register or counter, means tending to cause a backward movement of said counter or register, and gearing whereby the meter is required to overcome such backward tendency to rotation before it can produce registration on the counter or register.

In witness whereof I have hereunto set my hand this 21st day of September, 1901.

WILLIAM H. PRATT.

Witnesses:
DUGALD MCKILLOP,
ROBERT SHAND.